United States Patent
Zhang et al.

(10) Patent No.: US 11,954,327 B2
(45) Date of Patent: Apr. 9, 2024

(54) SYSTEM AND METHOD FOR MULTI-DEVICE MEDIA DATA MANAGEMENT, AND ROBOT DEVICE

(71) Applicants: HANGZHOU WEIMING XINKE TECHNOLOGY CO., LTD, Zhejiang (CN); ADVANCED INSTITUTE OF INFORMATION TECHNOLOGY (AIIT), PEKING UNIVERSITY, Zhejiang (CN)

(72) Inventors: Gaohan Zhang, Zhejiang (CN); Tao Wang, Zhejiang (CN)

(73) Assignees: HANGZHOU WEIMING XINKE TECHNOLOGY CO.. LTD, Zhejiang (CN); ADVANCED INSTITUTE OF INFORMATION TECHNOLOGY (AIIT) PEKING UNIVERSITY, Zhejiang (CN)

(*) Notice: Subject to any disclaimer, the term of this patent is extended or adjusted under 35 U.S.C. 154(b) by 0 days.

(21) Appl. No.: 17/614,989

(22) PCT Filed: Jun. 2, 2020

(86) PCT No.: PCT/CN2020/093878
§ 371 (c)(1),
(2) Date: Nov. 29, 2021

(87) PCT Pub. No.: WO2020/244494
PCT Pub. Date: Dec. 10, 2020

(65) Prior Publication Data
US 2022/0244853 A1 Aug. 4, 2022

(30) Foreign Application Priority Data
Jun. 3, 2019 (CN) .......................... 201910478036.3

(51) Int. Cl.
*G06F 3/00* (2006.01)
*G06F 3/06* (2006.01)

(52) U.S. Cl.
CPC .......... *G06F 3/0604* (2013.01); *G06F 3/0655* (2013.01); *G06F 3/067* (2013.01)

(58) Field of Classification Search
CPC ....... G06F 3/0604; G06F 3/0655; G06F 3/067
See application file for complete search history.

(56) References Cited

U.S. PATENT DOCUMENTS

2004/0117853 A1 6/2004 Karaoguz et al.
2004/0230863 A1* 11/2004 Buchhorn ........... G06F 11/1464
714/E11.12

(Continued)

FOREIGN PATENT DOCUMENTS

CN 102724302 A 10/2012
CN 103312571 A 9/2013

(Continued)

*Primary Examiner* — Craig S Goldschmidt
(74) *Attorney, Agent, or Firm* — MUNCY, GEISSLER, OLDS & LOWE, P.C.

(57) ABSTRACT

Disclosed by the present application are a system and method for multi-device media data management, and a robot device. A detection module detects a device located within a detection range, and determines according to a detection result whether to add the device to a device management list. A storage module obtains media data generated by each device in the device management list and stores the media data in a backup system in association with a corresponding tag. An instruction module receives an instruction of a user and analyzes the content of the instruction, the content comprising a tag and management type corresponding to the media data. A management module performs a management operation on corresponding media data according to the analyzed content. Thus, a plurality of devices may be actively detected and discovered, media data (Continued)

in corresponding devices may be obtained according to an instruction of the user, and be safely and reliably stored; in addition, intelligent searching for a plurality of tags may be conducted. Therefore, media data of a plurality of devices of a user may be integrally managed safely.

10 Claims, 6 Drawing Sheets

(56) References Cited

U.S. PATENT DOCUMENTS

| | | | | |
|---|---|---|---|---|
| 2005/0235128 | A1* | 10/2005 | Rustagi | G06F 3/067 |
| | | | | 711/170 |
| 2007/0061373 | A1* | 3/2007 | Kilday | G06F 16/125 |
| 2010/0293148 | A1* | 11/2010 | Cesario | G06F 11/1451 |
| | | | | 707/E17.007 |
| 2011/0301943 | A1* | 12/2011 | Patch | G06F 3/167 |
| | | | | 704/9 |
| 2013/0132484 | A1 | 5/2013 | Berezecki | |
| 2015/0023242 | A1* | 1/2015 | Sato | H04L 1/1809 |
| | | | | 370/312 |
| 2020/0037217 | A1* | 1/2020 | Shapiro | H04W 36/08 |

FOREIGN PATENT DOCUMENTS

| | | |
|---|---|---|
| CN | 103684992 A | 3/2014 |
| CN | 104113513 A | 10/2014 |
| CN | 104854816 A | 8/2015 |
| CN | 105634889 A | 6/2016 |
| CN | 105792009 A | 7/2016 |
| CN | 110391932 A | 10/2019 |

* cited by examiner

SYSTEM AND METHOD FOR MULTI-DEVICE MEDIA DATA MANAGEMENT, AND ROBOT DEVICE

TECHNICAL FIELD

The present application relates to the field of computer technology, in particular to a system and method for multi-device media data management, and a robot device.

BACKGROUND

With the development of modern communication technology, media data has increasingly become an important intangible asset of people. Media data is the center in many aspects such as life, entertainment, education, tourism, etc., and data is used for recording.

In most homes, there are many devices related to the generation, storage, display, and control of media data. For example, for the generation of media data, there are cameras, mobile phones, tablets, dashboard cameras, etc.; for the storage of media data, there are mobile phones, tablets, computers, memory cards, etc.; for the display of media data, there are mobile phones, tablets, computers, projection TVs, etc.; and for the control of media data, there are computer clients, mobile phone applications, web clients, etc.

Media data is stored in different forms in different devices, displayed in different ways, and needs to be controlled by different management modes. It is difficult for general home users to take care of all these devices, and they often fall into a state of almost desperation. For example, some management software can only run on specific platforms, operating systems, or have special permission requirements, and require separate user authentication, so they cannot be used uniformly on all the devices of the user, which causes inconvenience. In some existing solutions, cloud background servers are used for storage, in hope of meeting requirements of unified storage, display and control when combined with web-client control. However, the occurrence of many security incidents in recent years has caused people to be worried about cloud storage, especially for some private data related to personal privacy.

SUMMARY

An object of the present application is to provide a system and method for multi-device media data management, and a robot device, so as to be able to more safely manage user's multi-device media data in a unified manner.

In a first aspect, an embodiment of the present application provides a system for multi-device media data management, which includes:

a detection module, which is configured to detect devices within a detection range, and judge whether to add the devices to a device management list according to a detection result;

a storage module, which is configured to obtain media data generated by the devices in the device management list, and store the media data in association with corresponding labels in a backup system;

an instruction module, which is configured to receive user instructions and parse a content of the instructions, the content including labels and management types corresponding to the media data; and a management module, which is configured to perform management operations on the corresponding media data according to the parsed-out content.

In a possible implementation, in the above management system provided in the embodiment of the present application, the backup system is a network-attached storage (NAS) system.

In a possible implementation, in the above management system provided in the embodiment of the present application, the labels include at least one of the following: time, location, and person.

In a possible implementation, in the above management system provided in the embodiment of the present application, the management types include at least one of the following: query, add, delete, modify, and display.

In a possible implementation, in the above management system provided in the embodiment of the present application, the detection module is specifically configured to:

send detection data packets to the devices within the detection range through a preset service protocol, so as to detect devices with a specific service response; and add a device to the device management list if the response returned by the device is received.

In a possible implementation, in the above management system provided in the embodiment of the present application, the preset service protocol includes: a multicast domain name system (mDNS) protocol and a simple service discovery protocol (SSDP).

In a possible implementation, in the above management system provided in the embodiment of the present application, the management module is specifically configured to:

extract a common abstraction layer management interface protocol for different management modes of the devices in the device management list, so as to encapsulate a unified management mode for different devices by using the abstraction layer management interface protocol; and perform management operations on the corresponding media data according to the parsed-out content by using the unified management mode.

In a second aspect, an embodiment of the present application provides a method for multi-device media data management, which includes:

detecting, by a detection module, devices within a detection range, and judging, by the detection module, whether to add the devices to a device management list according to a detection result;

obtaining, by a storage module, media data generated by the devices in the device management list, and storing, by the storage module, the media data in association with corresponding labels in a backup system;

receiving user instructions and parsing a content of the instructions by an instruction module, the content including labels and management types corresponding to the media data; and performing management operations on the corresponding media data by a management module according to the parsed-out content.

In a possible implementation, in the above management method provided in the embodiment of the present application, the backup system is a network-attached storage (NAS) system.

In a possible implementation, in the above management method provided in the embodiment of the present application, the labels include at least one of the following: time, location, and person.

In a possible implementation, in the above management method provided in the embodiment of the present application, the management types include at least one of the following: add, delete, modify, and display.

In a possible implementation, in the above management method provided in the embodiment of the present application, the "detecting by the detection module devices within the detection range, and judging by the detection module whether to add the devices to the device management list according to the detection result" includes:

sending, by the detection module, detection data packets to the devices within the detection range through a preset service protocol, so as to detect devices with a specific service response; and adding a device to the device management list if the response returned by the device is received by the detection module.

In a possible implementation, in the above management method provided in the embodiment of the present application, the preset service protocol includes: a multicast domain name system (mDNS) protocol and a simple service discovery protocol (SSDP).

In a possible implementation, in the above management method provided in the embodiment of the present application, the "performing management operations on the corresponding media data by the management module according to the parsed-out content" includes:

extracting, by the management module, a common abstraction layer management interface protocol for different management modes of the devices in the device management list, so as to encapsulate a unified management mode for different devices by using the abstraction layer management interface protocol; and performing, by the management module, management operations on the corresponding media data according to the parsed-out content by using the unified management mode.

In a third aspect, an embodiment of the present application provides a robot device, which includes:

the system for multi-device media data management as described in the above first aspect and various embodiments of the first aspect.

As compared with the prior art, in the system and method for multi-device media data management and the robot device provided by the present application, the detection module detects the devices within the detection range, and judges whether to add the devices to the device management list according to the detection result. The storage module obtains the media data generated by the devices in the device management list, and stores the media data in association with the corresponding labels in the backup system. The instruction module receives user instructions and parses the content of the instructions. The content includes labels and management types corresponding to the media data. The management module performs management operations on the corresponding media data according to the parsed-out content. Therefore, the present disclosure can actively detect and discover multiple devices, obtain the media data in the corresponding devices according to the user instructions, store it safely and reliably, and can also perform multi-label smart search. Therefore, the present disclosure can manage the user's multi-device media data more safely in a unified manner.

DETAILED DESCRIPTION

Specific embodiments of the present application will be described in detail below in conjunction with the drawings, but it should be understood that the scope of protection of the present application is not limited by the specific embodiments.

Unless expressly stated otherwise, term "include" or its variants such as "including" or "includes" will be understood to include the stated elements or components throughout the specification and claims, and other elements or other components are not excluded.

Figure 1:
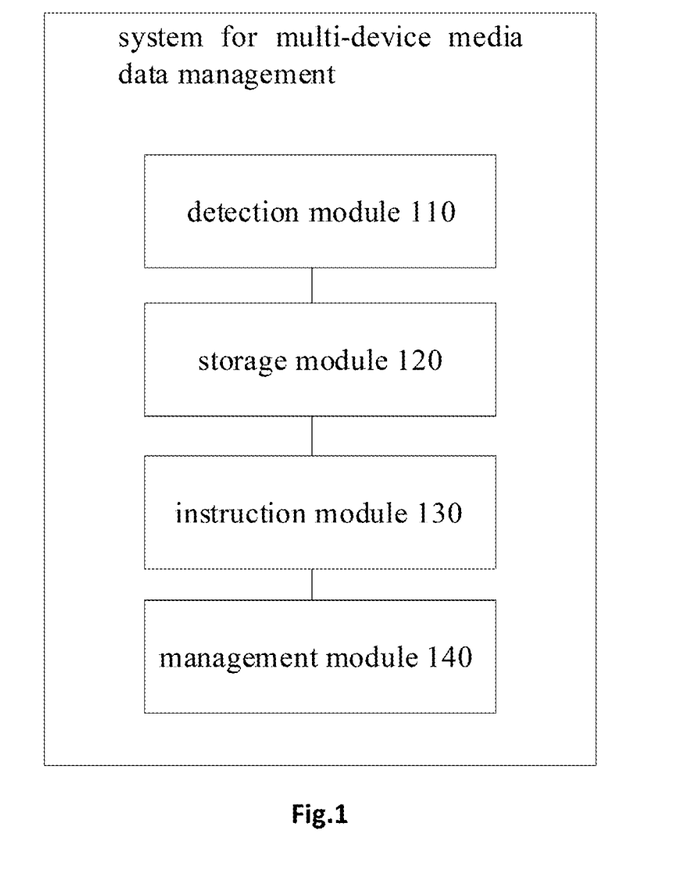
FIG. 1 is a schematic structural diagram of a system for multi-device media data management according to a first embodiment of the present application.

FIG. 1 is a schematic structural diagram of a system for multi-device media data management according to a first embodiment of the present application. As shown in FIG. 1, the management system includes: a detection module 110, a storage module 120, an instruction module 130, and a management module 140.

The detection module 110 is configured to detect devices within a detection range, and judge whether to add the devices to a device management list according to a detection result. For example, the detection range may be a home local area network (or home network), and multiple devices (various home smart devices, such as cameras, mobile phones, tablets, and projection TVs) and the management system provided by this embodiment (such as a robot device) are all connect to the home local area network (home LAN). The detection module 110 can actively detect and discover the smart devices in the above home local area network through a certain broadcast discovery protocol.

In an embodiment, the detection module 110 may be specifically configured to: send detection data packets to the devices within the detection range through a preset service protocol, so as to detect devices with a specific service response; and add a device to the device management list if the response returned by the device is received. The preset service protocol may be a multicast domain name system (mDNS) protocol and a simple service discovery protocol (SSDP).

For example, taking a robot for unified management of home multi-device media data as an example of the above management system, the robot actively accesses the home LAN. The robot sends active detection data packets to the home LAN through universal protocols such as mDNS and SSDP to detect smart devices with a specific service response. If the robot discovers a new device, it will add the new device to the manageable device management list. If the device is a device that has been discovered already, the robot will update device information or ignore the device. If there is no response from the device, the robot will wait until timeout and end this detection. Finally, the robot can detect the smart devices in the device management list and their different service types (such as camera, mobile phone, projection TV, etc.), so that the next step of data obtaining and safe and reliable storage can be performed.

The storage module 120 is configured to obtain media data generated by the devices in the device management list, and store the media data in association with corresponding labels in a backup system. The backup system may be a network-attached storage (NAS) system. In practical applications, still by taking the above robot as an example, the robot has multiple built-in large-capacity hard disks which form redundant arrays of independent disks (RAID) to ensure reliable storage of data. The disk data is managed through the NAS system, and the media data can be safely managed by distinguishing different users and permissions. For example, the locally stored data is compared with the media data in the multiple devices to discover newly added data and expired data and update a locally stored status. After the storage module 120 obtains the media data generated by the devices in the device management list, it extracts the corresponding labels, and stores the media data in association with the corresponding labels in the backup system. The labels include at least one of the following: time, location, and person.

The instruction module 120 is configured to receive user instructions and parse a content of the instructions. The content includes labels and management types corresponding to the media data. The management types include at least one of the following: query, add, delete, modify, and display. For example, the user instruction is "I want to see the photos taken yesterday in Hangzhou", "Delete the photos taken yesterday by the mobile phone", and so on.

Figure 2:
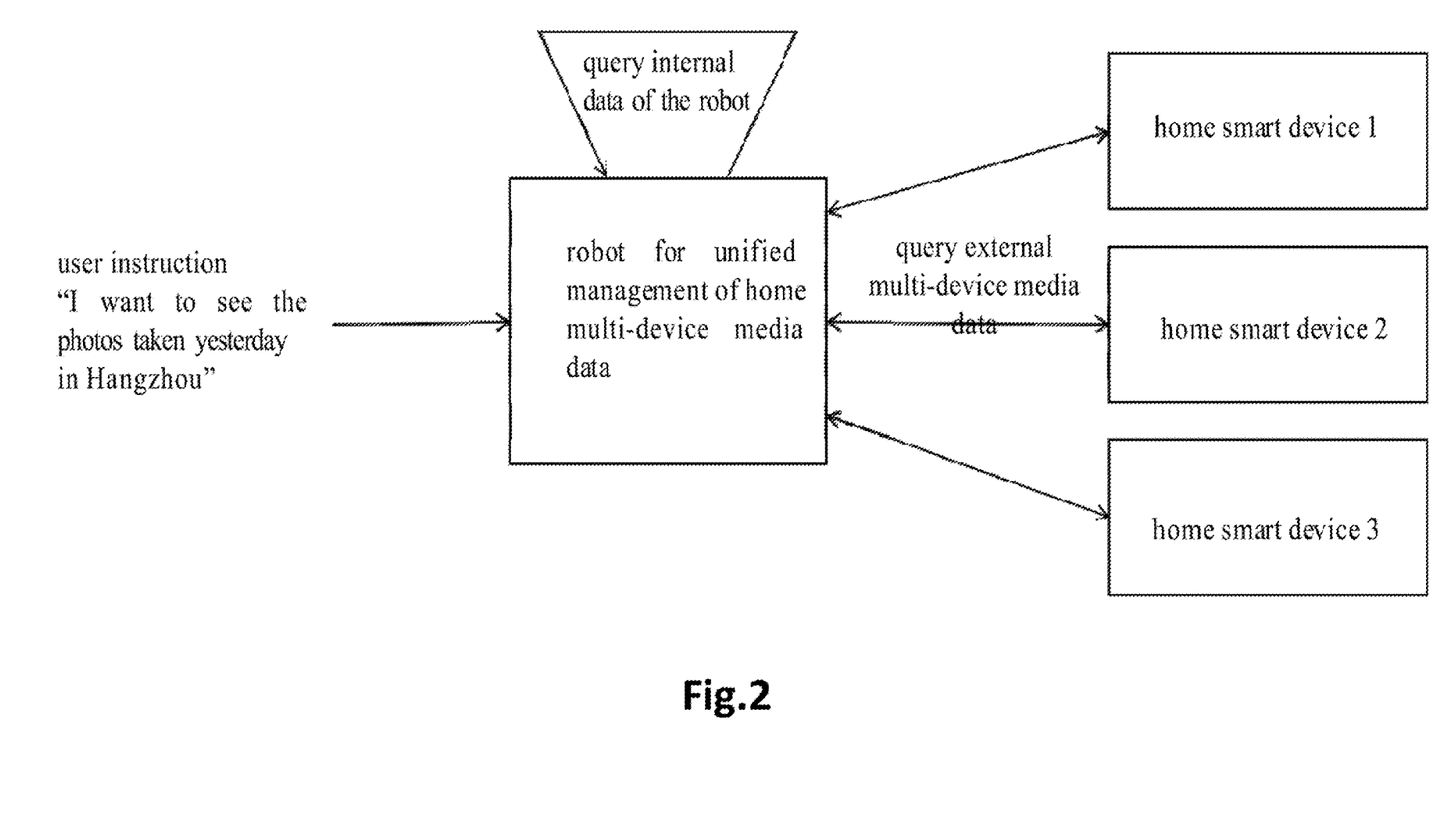
FIG. 2 is a schematic flowchart of user instruction processing according to the first embodiment of the present application.

In practical applications, still by taking the above robot as an example, the robot listens to the user's voice instructions, intelligently analyzes the user's intention, analyzes the labels of the time, location, and person to be searched for, and intelligently searches for the locally stored media data. If the media data that meets the labels can be discovered, the media data will be returned; and if the media data that meets the label cannot be discovered, an obtaining request may be sent to the devices in the device management list. If the media data in other devices meets the search label, the corresponding media data will be returned; otherwise, there will be a prompt that there is no corresponding media data. With reference to FIG. 2, a schematic flowchart of user instruction processing is shown.

The management module 140 is configured to perform management operations on the corresponding media data according to the parsed-out content. Corresponding to the management types, the management operations may be query operation, add operation, delete operation, modify operation, or display operation. In order to manage the media data of different devices in a unified management mode, reduce learning cost and simplify user operations, in an embodiment, the management module 140 may be specifically configured to: extract a common abstraction layer management interface protocol for different management modes of the devices in the device management list, so as to encapsulate a unified management mode for different devices by using the abstraction layer management interface protocol; and perform management operations on the corresponding media data according to the parsed-out content by using the unified management mode.

Figure 3:
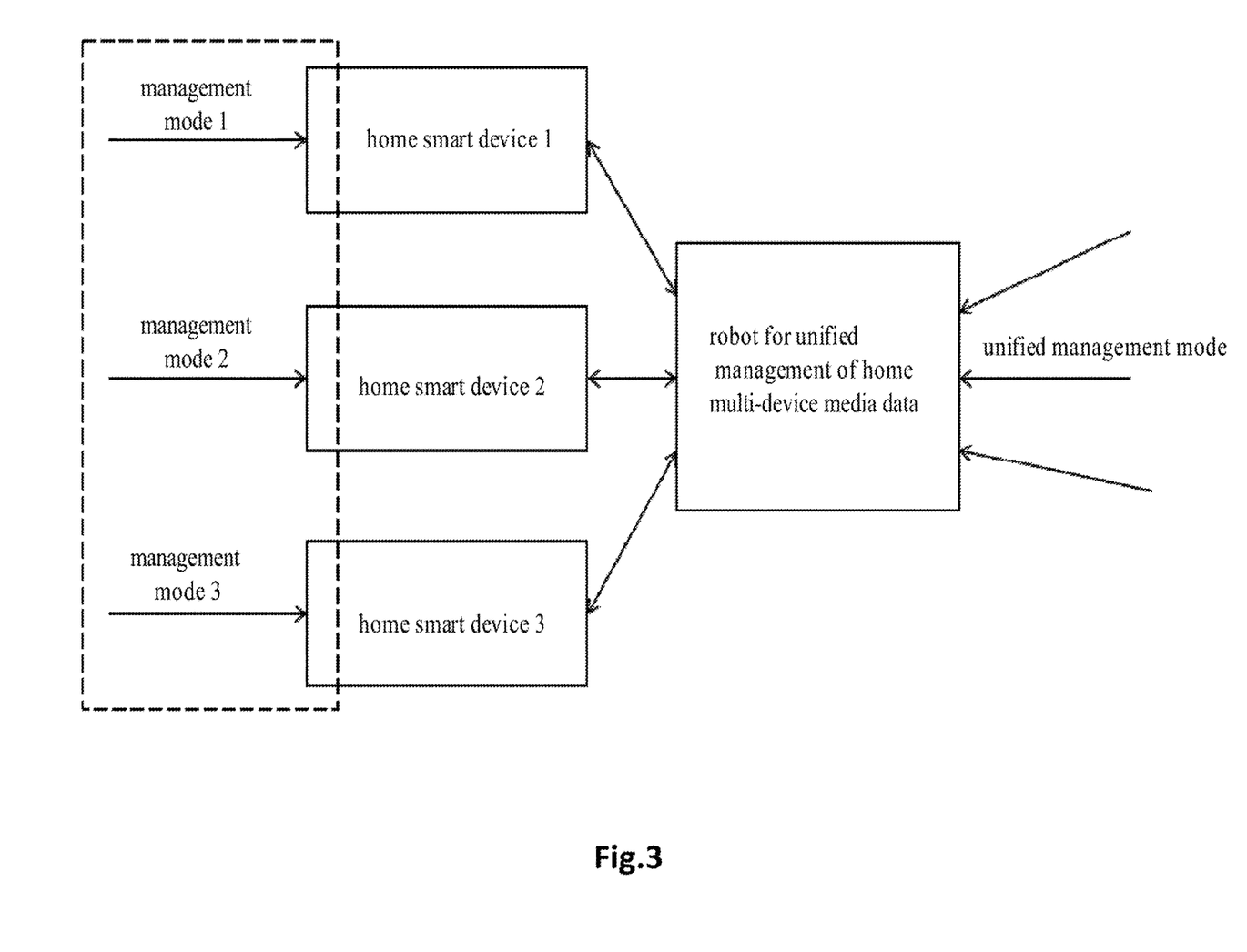
FIG. 3 is a schematic diagram of constructing a unified management mode according to the first embodiment of the present application.

In practical applications, as shown in FIG. 3, the robot extracts a common abstraction layer management interface protocol for the management modes of different smart devices, and uses the abstraction layer management interface protocol to dynamically implement management modes that adapt to different smart devices and provide users with a simple and easy-to-use interactive mode of the upper encapsulation for media data management.

Figure 4:
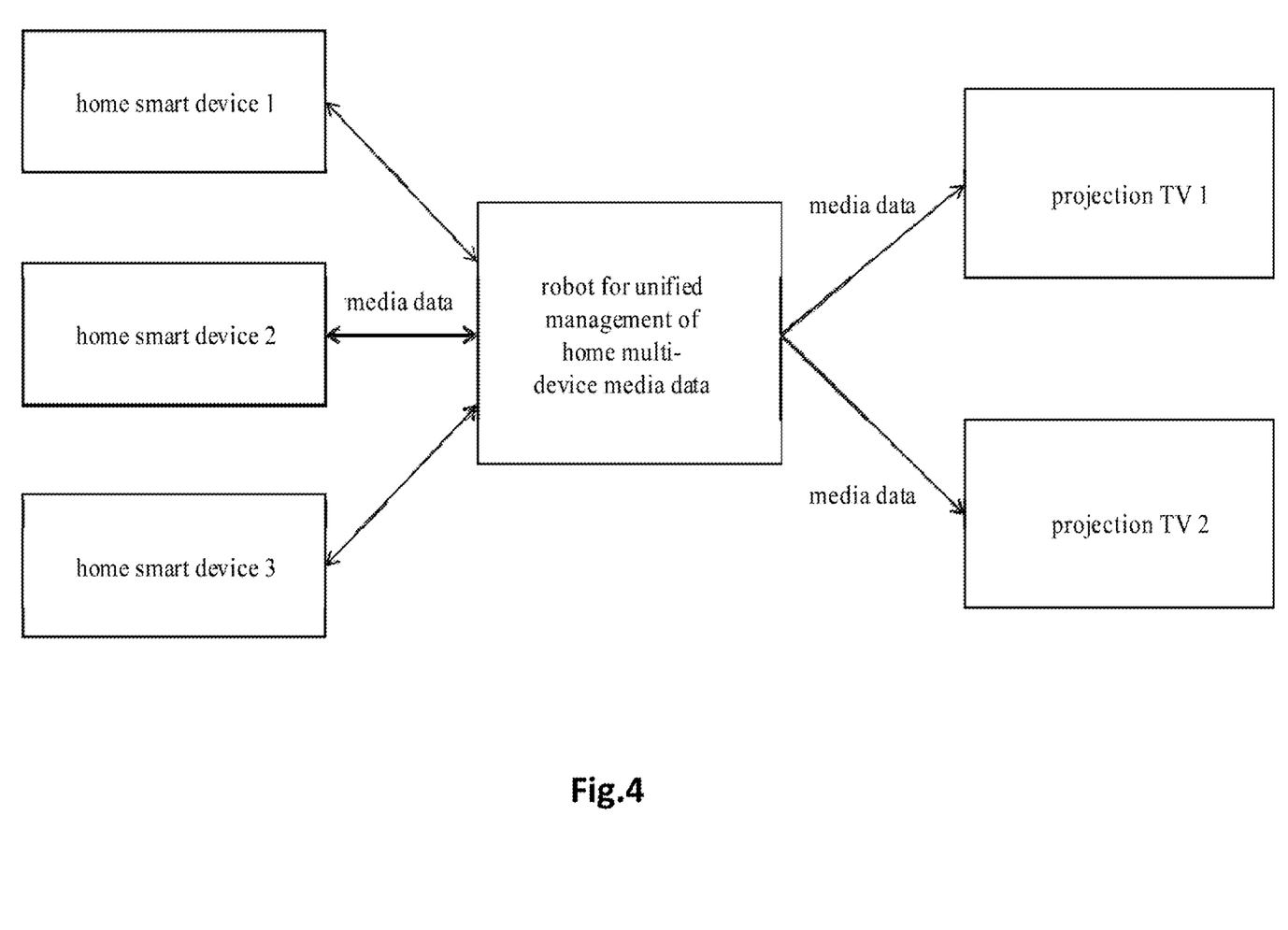
FIG. 4 is a schematic flowchart of projecting and displaying media data to different devices according to the first embodiment of the present application.

For example, the process of projecting and displaying the media data by the robot for unified management of home multi-device media data to different devices is shown in FIG. 4, in which: the robot listens to the user's voice instructions, intelligently analyzes which projection TV the user wants to project with, then uses a universal projection protocol or a self-defined private protocol to connect to the corresponding projection TV, and finally sends the corresponding media data to the designated projection TV for display.

In the system for multi-device media data management provided in this embodiment, the detection module detects the devices within the detection range, and judges whether to add the devices to the device management list according to the detection result. The storage module obtains the media data generated by the devices in the device management list, and stores the media data in association with the corresponding labels in the backup system. The instruction module receives user instructions and parses the content of the instructions. The content includes labels and management types corresponding to the media data. The management module performs management operations on the corresponding media data according to the parsed-out content. Therefore, the present disclosure can actively detect and discover multiple devices, obtain the media data in the corresponding devices according to the user instructions, store it safely and reliably, and can also perform multi-label smart search. Therefore, the present disclosure can manage the user's multi-device media data more safely in a unified manner.

In combination with the system for multi-device media data management described in the first embodiment above, the following method embodiment is proposed. For details that are not disclosed in this method embodiment, reference may be made to the first embodiment above.

Figure 5:
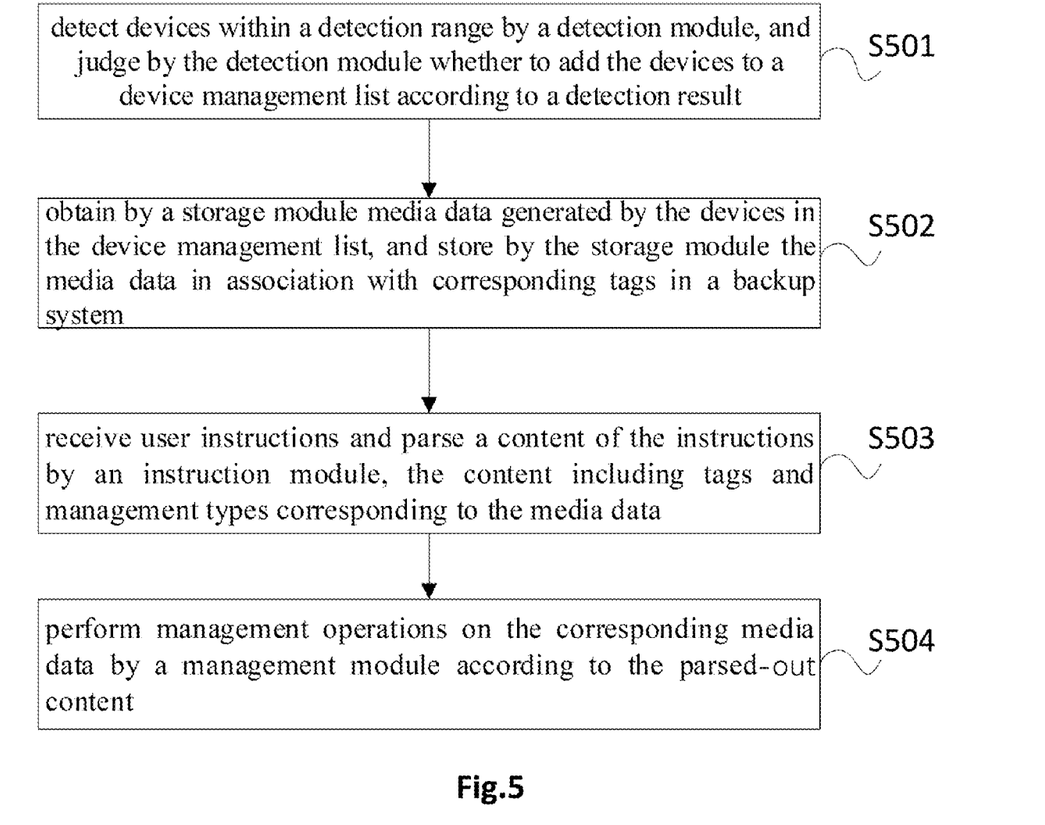
FIG. 5 is a schematic flowchart of a method for multi-device media data management according to a second embodiment of the present application.

FIG. 5 is a schematic flowchart of a method for multi-device media data management according to a second embodiment of the present application. As shown in FIG. 5, the method includes:

S501: detecting, by a detection module, devices within a detection range, and judging, by the detection module, whether to add the devices to a device management list according to a detection result;

S502: obtaining, by a storage module, media data generated by the devices in the device management list, and storing, by the storage module, the media data in association with corresponding labels in a backup system;

S503: receiving user instructions and parsing a content of the instructions by an instruction module, the content including labels and management types corresponding to the media data; and S504: performing management operations on the corresponding media data by a management module according to the parsed-out content.

In the method for multi-device media data management provided in this embodiment, the detection module detects the devices within the detection range, and judges whether to add the devices to the device management list according to the detection result. The storage module obtains the media data generated by the devices in the device management list, and stores the media data in association with the corresponding labels in the backup system. The instruction module receives user instructions and parses the content of the instructions. The content includes labels and management types corresponding to the media data. The management module performs management operations on the corresponding media data according to the parsed-out content. Therefore, the present disclosure can actively detect and find multiple devices, obtain the media data in the corresponding devices according to the user instructions, store it safely and reliably, and can also perform multi-label smart search. Therefore, the present disclosure can manage the user's multi-device media data more safely in a unified manner.

In a possible implementation, in the above management method provided in the embodiment of the present application, the backup system is a network-attached storage (NAS) system.

In a possible implementation, in the above management method provided in the embodiment of the present application, the labels include at least one of the following: time, location, and person.

In a possible implementation, in the above management method provided in the embodiment of the present application, the management types include at least one of the following: add, delete, modify, and display.

In a possible implementation, in the above management method provided in the embodiment of the present application, step 501 may be implemented in the following way:

sending, by the detection module, detection data packets to the devices within the detection range through a preset service protocol, so as to detect devices with a specific service response; and adding a device to the device management list if the response returned by the device is received by the detection module.

In a possible implementation, in the above management method provided in the embodiment of the present application, the preset service protocol includes: a multicast domain name system (mDNS) protocol and a simple service discovery protocol (SSDP).

In a possible implementation, in the above management method provided in the embodiment of the present application, step 504 may be implemented in the following way:

extracting, by the management module, a common abstraction layer management interface protocol for different management modes of the devices in the device management list, so as to encapsulate a unified management mode for different devices by using the abstraction layer management interface protocol; and performing, by the management module, management operations on the corresponding media data according to the parsed-out content by using the unified management mode.

Figure 6:
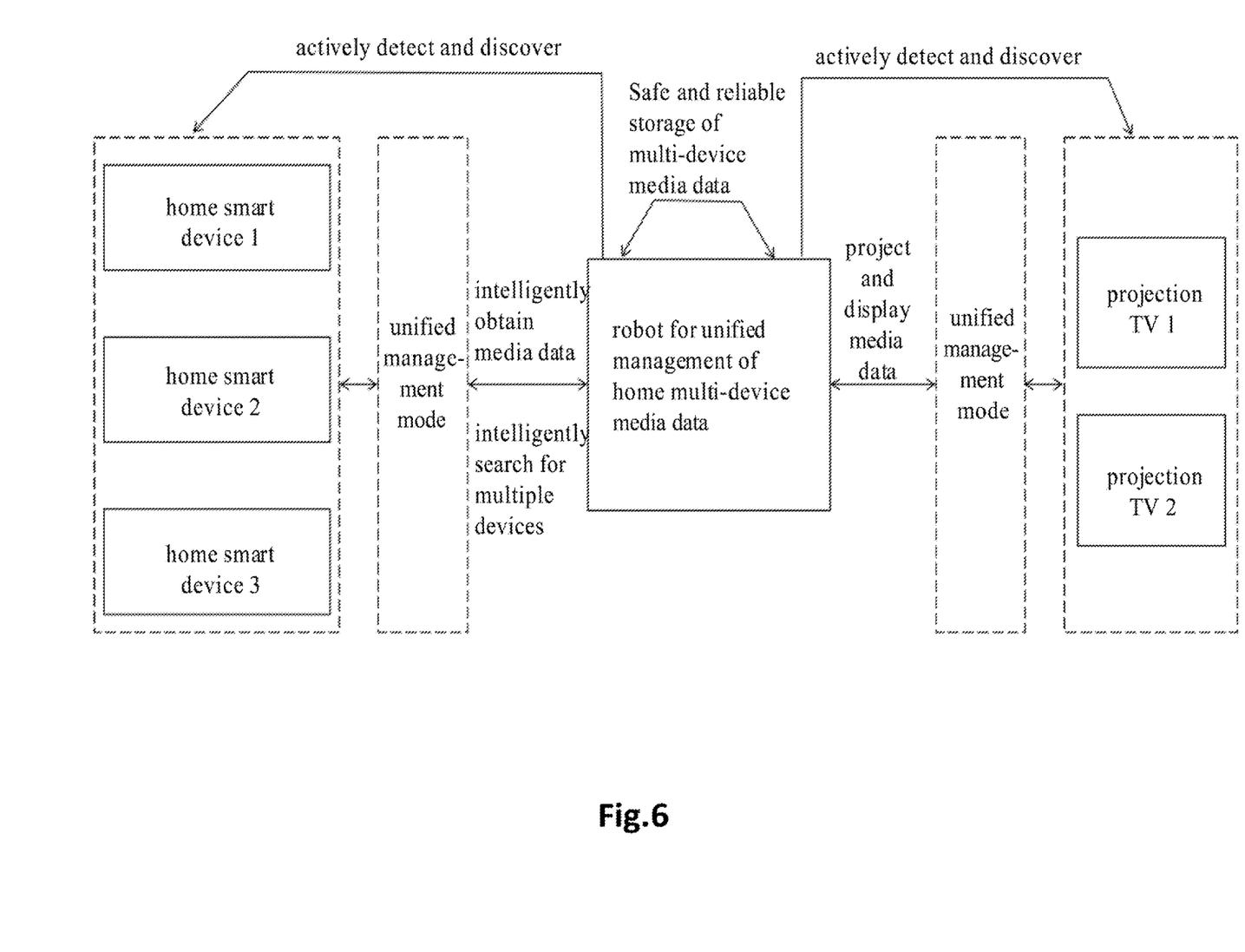
FIG. 6 is a schematic diagram of unified management of home devices by a robot device according to a third embodiment of the present application.

A third embodiment of the present application provides a robot device. The robot device includes the system for multi-device media data management described in the first embodiment above, and the method for multi-device media data management described in the second embodiment above is used to manage multiple devices. The robot can access the home network to perform unified management of multiple devices in the home. The specific management process is shown in FIG. 6.

The above description of specific exemplary embodiments of the present application is for the purpose of explanation and illustration. The description is not intended to limit the present application to the precise form disclosed, and it is obvious that many changes and variations can be made based on the above teachings. The purpose of selecting and describing the exemplary embodiments is to explain the specific principles of the present application and practical applications thereof, so that those skilled in the art can realize and use various different exemplary embodiments and various different selections and changes of the present application. The scope of the present application is intended to be defined by the claims and their equivalents.

The invention claimed is:

1. A system for multi-device media data management on a network, comprising:
    a detection module, which is configured to detect media devices connected to the network within a detection range, judge whether to add the media devices to a device management list according to a detection result, and add the media devices to the device management list according to the judgement;
    a storage module, which is configured to receive media data generated by the media devices in the device management list via the network, and store the media data in association with corresponding labels in a backup system;
    an instruction module, which is configured to receive a user's voice instructions for performing management operations on the media data and parse a content of the voice instructions, the content comprising labels and management types corresponding to the media data; and
    a management module, which is configured to select at least one of the media devices in the device management list based on the parsed-out content and the corresponding media data, and perform the management operations on the corresponding media data stored in the storage module by the selected at least one of the media devices according to the parsed-out content.

2. The system for multi-device media data management according to claim 1, wherein the backup system is a network-attached storage (NAS) system.

3. The system for multi-device media data management according to claim 1, wherein the labels comprise at least one of the following: time, location, and person.

4. The system for multi-device media data management according to claim 1, wherein the management types comprise at least one of the following: query, add, delete, modify, and display.

5. The system for multi-device media data management according to claim 1, wherein the detection module is specifically configured to:
    send detection data packets to the media devices within the detection range through a preset service protocol, so as to detect media devices with a specific service response; and
    add a media device to the device management list if the response returned by the media device is received.

6. The system for multi-device media data management according to claim 5, wherein the preset service protocol comprises: a multicast domain name system (mDNS) protocol and a simple service discovery protocol (SSDP).

7. The system for multi-device media data management according to claim 1, wherein the management module is specifically configured to:
    extract a common abstraction layer management interface protocol for different management modes of the media devices in the device management list, so as to encapsulate a unified management mode for different devices by using the abstraction layer management interface protocol; and
    perform management operations on the corresponding media data according to the parsed-out content by using the unified management mode.

8. A method for multi-device media data management on a network, comprising:
- detecting, by a detection module, media devices connected to the network within a detection range, judging, by the detection module, whether to add the media devices to a device management list according to a detection result, and add the media devices to the device management list according to the judgement;
- receiving, by a storage module, media data generated by the media devices in the device management list via the network, and storing, by the storage module, the media data in association with corresponding labels in a backup system;
- receiving a user's voice instructions for performing management operations on the media data and parsing a content of the voice instructions by an instruction module, the content comprising labels and management types corresponding to the media data;
- selecting at least one of the media devices in the device management list based on the parsed-out content and the corresponding media data; and
- performing the management operations on the corresponding media data stored in the storage module by a management module by the selected at least one of the media devices according to the parsed-out content.

9. The method for multi-device media data management according to claim 8, wherein the backup system is a network-attached storage (NAS) system.

10. A robot device, comprising:
- the system for multi-device media data management according to claim 1.

* * * * *